United States Patent
Quadir

(10) Patent No.: US 9,566,562 B1
(45) Date of Patent: Feb. 14, 2017

(54) HIGH-TEMPERATURE OPEN-CELL POROUS CERAMIC

(75) Inventor: Tariq Quadir, Colchester, VT (US)

(73) Assignee: Superior Technical Ceramics Corporation, St. Albans, VT (US)

( * ) Notice: Subject to any disclaimer, the term of this patent is extended or adjusted under 35 U.S.C. 154(b) by 1024 days.

(21) Appl. No.: 13/591,059

(22) Filed: Aug. 21, 2012

(51) Int. Cl.
  B01J 20/16 (2006.01)
  B01J 29/06 (2006.01)
  C01B 39/02 (2006.01)
  B01J 20/28 (2006.01)

(52) U.S. Cl.
  CPC ........... *B01J 20/16* (2013.01); *B01J 20/28054* (2013.01); *B01J 29/06* (2013.01); *C01B 39/02* (2013.01); *Y10T 428/249985* (2015.04); *Y10T 428/2996* (2015.01)

(58) Field of Classification Search
  None
  See application file for complete search history.

(56) References Cited

U.S. PATENT DOCUMENTS

| | | | |
|---|---|---|---|
| 3,737,491 A | 6/1973 | Stander et al. | |
| 3,755,204 A * | 8/1973 | Sergeys | 502/241 |
| 3,993,495 A | 11/1976 | Galliath et al. | |
| 4,556,096 A | 12/1985 | Nagata et al. | |
| 4,588,540 A | 5/1986 | Kiefer et al. | |
| 4,707,311 A | 11/1987 | Okazaki | |
| 4,713,302 A | 12/1987 | Komatsu | |
| 4,729,972 A | 3/1988 | Kodama et al. | |
| 4,839,049 A | 6/1989 | Kinney, Jr. et al. | |
| 4,904,291 A | 2/1990 | Siebers et al. | |
| 5,762,737 A | 6/1998 | Bloink et al. | |
| 5,851,460 A | 12/1998 | Bauer et al. | |
| 6,086,648 A * | 7/2000 | Rossetti, Jr. | B24D 3/18 451/28 |
| 6,660,224 B2 | 12/2003 | Lefebvre et al. | |
| 6,664,205 B2 | 12/2003 | Oda et al. | |
| 6,702,650 B2 * | 3/2004 | Adefris | C09K 3/1436 451/41 |
| 7,037,477 B2 | 5/2006 | Tomita et al. | |
| 7,108,828 B2 | 9/2006 | Lefebvre et al. | |
| 7,422,784 B2 | 9/2008 | Furukawa et al. | |
| 7,632,364 B1 | 12/2009 | Jouet et al. | |
| 7,699,903 B2 | 4/2010 | Stobbe et al. | |
| 7,959,716 B2 | 6/2011 | Song et al. | |
| 8,007,696 B2 | 8/2011 | Zambaldo | |
| 2002/0032114 A1 | 3/2002 | Yi et al. | |
| 2002/0043735 A1 | 4/2002 | Miyakawa | |

(Continued)

OTHER PUBLICATIONS

Carraher, Jr., Charles E., Carraher's Polymer Chemistry 9th Edition, 2014, CRC Press, pp. 428-432.*

(Continued)

*Primary Examiner* — Humera Sheikh
*Assistant Examiner* — Elaine M Vazquez
(74) *Attorney, Agent, or Firm* — Thomas G. Ference

(57) ABSTRACT

A high-temperature open-cell porous body, the body comprises crystalline inorganic particles and 0.5 to 3-weight percent glass. The crystalline inorganic particles are bonded together by the glass to form a matrix with interconnected pores having a porosity of greater than 20-percent. The crystalline inorganic particles may further include interconnected micro pores, the latter combination providing a matrix with both macro porosity and micro porosity.

35 Claims, 4 Drawing Sheets

(56) References Cited

U.S. PATENT DOCUMENTS

| | | |
|---|---|---|
| 2003/0114293 A1* | 6/2003 | Mizuno ............... B01D 39/201 501/80 |
| 2005/0095416 A1 | 5/2005 | Hanzawa et al. |
| 2008/0057268 A1* | 3/2008 | Lu et al. .................. 428/116 |
| 2008/0159899 A1* | 7/2008 | Neirinck et al. ............. 419/2 |
| 2008/0202080 A1 | 8/2008 | Barataud-Dien et al. |
| 2009/0029103 A1 | 1/2009 | Hiramatsu et al. |
| 2010/0028710 A1 | 2/2010 | Gros et al. |

OTHER PUBLICATIONS

Baz-Dresch, et al., "Evaluation of Catalyzed Diesel Particulate Filters Used in an Underground Metal Mine", Report of Investigations, 1993, U.S. Bureau of Mines.*
W. D. Kingery et al., Introduction to Ceramics, 2nd. Edition, Chapter 10.2, (1976), p. 469, John Wiley & Sons, New York.
M. Gardner, "Packing Spheres", Chapter 7 in Martin Gardner's New Mathematical Diversions from Scientific American, (1966), pp. 82-90, Simon and Schuster, New York.

* cited by examiner

HIGH-TEMPERATURE OPEN-CELL POROUS CERAMIC

FIELD

This invention generally relates to an open-cell porous body. More specifically it relates to an open-cell porous body comprising crystalline inorganic particles and glass, the crystalline inorganic particles are bonded together by the glass to form a matrix with interconnected pores.

BACKGROUND

High-temperature open-cell porous bodies have a variety of applications, most notably as gas and liquid filters. Low porosity bodies are easily achieved using standard processing of ceramic and other refractory materials. However, high-porosity open-cell structures are more difficult to achieve, especially for use above 1200° C. in air. One process for making open-cell porous bodies includes the under-firing of ceramic particles to retain porosity (Kingery et al.). This process, however, has poor porosity control. For example, this process is sensitive to small temperature variations that create different percentages of porosity. If the under-fired body is further used at a temperature higher than the original sintering temperature, the material will further collapse with a resulting shrinkage and loss of porosity. As there is a continued need for higher temperature open-cell porous bodies, it is the goal of the present invention to provide both a new process for obtaining high-temperature open-cell porous bodies and create new open-cell porous structures for use at high temperatures.

SUMMARY

One aspect of the present invention is directed to an open-cell porous body, comprising crystalline inorganic particles and 0.5 to 3-weight percent glass. The crystalline inorganic particles are bonded together by the glass to form a matrix with interconnected pores having a porosity of greater than 20-percent by volume.

Another aspect of the present invention is directed to an open-cell porous body, comprising crystalline inorganic particles having a micro porous open-cell structure and 0.5 to 3-weight percent glass. The crystalline inorganic particles are bonded together by the glass to form a matrix with interconnected pores having a macro porosity of greater than 20-percent and a micro porosity on the surface of or within the crystalline inorganic particles.

Still another aspect of the present invention is directed to a method of fabricating an open-cell porous body, comprising the steps of providing crystalline inorganic particles, glass particles and an organic binder. The method involves combining the crystalline inorganic particles, glass particles and organic binder into a mixture; compacting and drying the mixture into a green open-cell compact; and then sintering the green open-cell compact at or above the working point of the glass so that the glass particles wet the location where the crystalline inorganic particles meet to create bonds that form a matrix having interconnected pores.

BRIEF DESCRIPTION OF DRAWINGS

The foregoing and other aspects and advantages of the present invention will be apparent from the following detailed description, as illustrated in the accompanying drawings, in which:

FIG. 3b is a schematic representation of an open-cell micro porous particle resulting after sintering the composition depicted in FIG. 3a, the resulting structure having interconnected pores, the micro porous particle may be used as the crystalline inorganic particles that have micro porosity as shown in FIG. 2a;

DETAILED DESCRIPTION

Figure 1A:
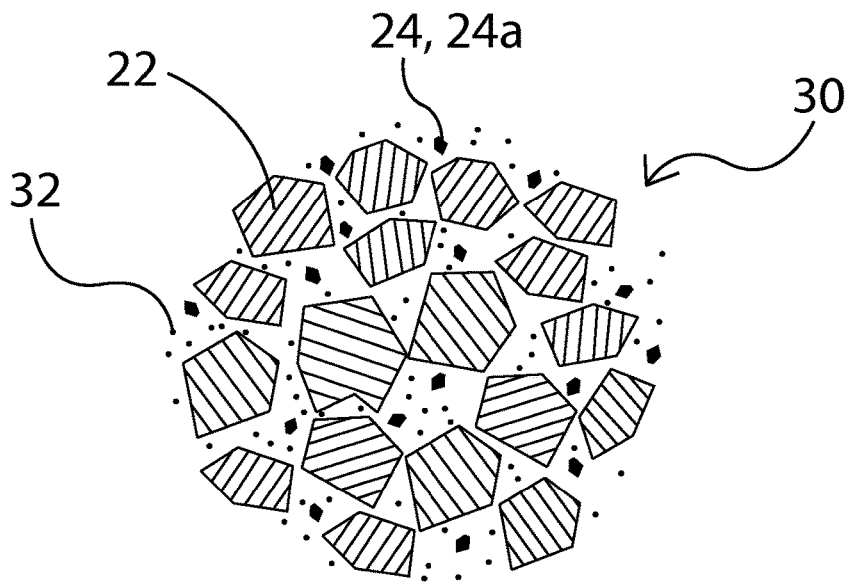
FIG. 1a is a schematic representation of a composition according to the invention, the schematic depicting a mixture of crystalline inorganic particles, glass particles and an organic binder.
Figure 1B:
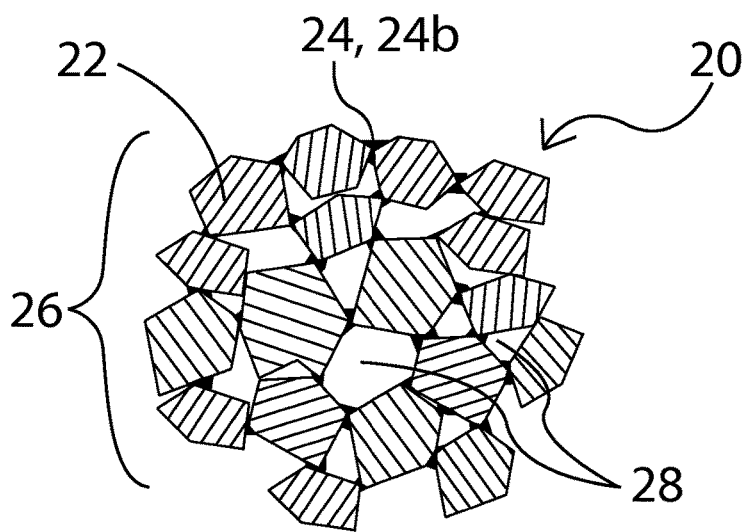
FIG. 1b is a schematic representation of an open-cell porous body resulting after sintering the composition depicted in FIG. 1a, the resulting structure having interconnected pores.

FIG. 1b illustrates a porous body 20 comprising inorganic crystalline particles 22 bonded together by glass 24. The combined structure of inorganic crystalline particles 22 bonded together by glass 24 creates a matrix 26 that contains interconnected pores 28. Porous body 20 preferably has porosity greater than 20-percent by volume insuring that the porous body is an open-cell porous body. Porous body 20 may take on any shape necessary for the intended use of the open-cell porous body. Some exemplary uses include, but are not limited to gas filters, liquid filters, catalytic converters and a precursor structure to composite materials.

Matrix 26 is formed by sintering green open-cell compact 30, illustrated in FIG. 1a. Green open-cell compact 30 comprises inorganic crystalline particles 22, glass particles 24a and an organic binder 32. The green open-cell compact 30 is then sintered above 1550° C. During the sintering process organic binder 32 volatilizes, glass particles 24a melt, wet and bond with crystalline inorganic particles 22. In regions where two crystalline inorganic particles 22 are in close proximity to each other, glass 24 connects the crystalline inorganic particles. As the sintering temperature is lowered, the connecting glass solidifies below working temperature to create glass regions 24b that bond crystalline inorganic particles 22. The resulting structure, matrix 26, is crystalline inorganic particles 22 bonded by glass regions 24b with interconnected pores 28. The resulting structure results in a porous body 20 that is preferably stable above 1200° C. Porous body 20 also has a modulus of rupture greater than 1 kpsi and up to 4 kpsi or greater.

Inorganic crystalline particles 22 generally have an average size of greater than 44-microns. The size distribution of inorganic crystalline particles 22 is preferably a narrow distribution, which will insure a low packing factor. One of the novel aspects of porous body 20 disclosed is that the porous body can be created from large crystalline inorganic particles 22 greater than 44-microns, even greater than 250-microns. Large particles are hard to sinter without glass because large particles possess long diffusion distances within each particle that restricts the rate of reactions and bonding at contacting boundaries. The distribution of many small glass particles at contacting boundaries provides for short diffusion distances so that reactions may take place a higher rates and at lower temperatures. Glass facilitates bonding by acting as a bonding agent. Another novel aspect is that porous body 20 can be created from a variety of different types of inorganic crystalline particles 22 of the same material but created from different precursor particles. Inorganic crystalline particles 22 may be precursor particles such as single crystal particles, polycrystalline aggregates or granules. Single crystal particles are particles in which the crystal lattice of the entire sample is continuous and unbroken to the edges of the particle, with no grain boundaries. Single crystal particles may be prepared by taking a larger single crystal and crushing the single crystal into smaller particles to form a powder. Aggregates are clusters of single crystal particles with irregular shape from a sintered body. Aggregates may be formed by crushing polycrystalline material into a powder. Granules are clusters of single crystal particles with a generally spherical shape. Granules may be formed by spray or pan drying particles into a powder. Inorganic crystalline particles 22 may be at least one from the group including an oxide, carbide, nitride, boride and refractory metals. Examples of oxides include, but are not limited to, $Al_2O_3$, $ZrO_2$, $SiO_2$, $Al_2O_3 \cdot SiO_2$, ZnO, $SnO_2$, $TiO_2$ and MgO. Examples of carbides include, but are not limited to, SiC, TiC, $B_4C$ and ZrC. Examples of nitrides include, but are not limited to, $Si_3N_4$, TiN, ZrN and BN. Examples of borides include, but are not limited to, $TiB_2$, TaB, $SiB_4$ and $AlMgB_{14}$. Examples of metals include, but are not limited to, Zr, Pt and other high melting point metals.

Glass particles 24a, for a porous body 20 having a single porosity distribution, are selected to have a glass working point (W.P.) above 900° C. The working point is the temperature at which the viscosity of the glass is less than $10^4$ poise, and can therefore wet crystalline inorganic particles 22. For the creation of even higher temperature open-cell porous bodies, glass particles 24a with a glass working temperature of 1000° C. may be required. In general the higher the working temperature of glass particles 24a, the higher the ultimate use temperature that results for porous body 20. Glass particles 24a preferably have silica content greater than 50-percent by weight. Silica contents over 50-percent by weight insure that the resulting porous body 20 will be acid resistant. Glass particles 24a generally are selected to have an average particle size distribution that is roughly 10-to-20 times smaller than the average particle size distribution of crystalline inorganic particles 22. This smaller glass size distribution allows glass particles 24a to exist as many glass particles in contact with the crystalline inorganic particle's 22 surface, create many point contacts, and therefore helps facilitate wetting and bonding where any two crystalline inorganic particles touch.

One or more organic binders 32 may be mixed with glass particles 24a and inorganic crystalline particles 22 to create green open-cell compact 30. Water may further be incorporated with organic binder 32. Organic binders 32 act as a material that holds the glass particles 24a and inorganic crystalline particles 22 together to form the basic shape of a green open-cell compact 30. During sintering, organic binders 32 and any water burn off, while still leaving the shape of the porous body 20 intact. Some examples of organic binders that may be used to form green open-cell compact 30 include polyvinyl alcohol (PVA) and polyethylene glycol (PEG). Other binders include, but are not limited to acrylic binders, gum and waxes.

High-temperature open-cell porous body 20 is generally formed as follows. Measured amounts of inorganic crystalline particles 22, glass particles 24a, organic binder 32 and any water are mixed together in an EIRICH®-type mixer. The resulting granulated powder is then iso-pressed or mechanically pressed into a given shape as green open-cell compact 30. Green open-cell compact 30 is then heated to a temperature of 350° C. to 600° C. to burn off organic binder 32. The sintering temperature is then raised above the working point of glass particles 24a allowing the glass to wet between and around contact points of adjacent inorganic crystalline particles 22. During sintering, the temperature may be raised from a few degrees to a few hundred degrees above the working point of glass particles 24a. The molten glass 24 then reacts with inorganic crystalline particles 22 forming higher melting point compounds. The amount that the sintering temperature is raised above the working point of glass 24 is determined by the final desired use temperature of porous body 20. Shrinkage of green open-cell compact 30 of about one-to-fifteen percent is expected during the sintering process. The porous body 20 is then cooled allowing glass 24 to solidify creating glass regions 24b that bond crystalline inorganic particles 22. The process results in a porous body 20 that can be used above the working point of glass 24.

It is critical to have the size of the initial glass particles 24a much smaller in diameter than the diameter of the crystalline inorganic particles. Glass particles 24a generally are selected to have an average particle size distribution that is roughly 10-to-20 times smaller than the average particle size distribution of crystalline inorganic particles 22. The small size of glass particles 24a facilitates wide distribution of the glass particles over the surface of crystalline inorganic particles 22, creates a large number of contact points and allows for low percentages by weight of the glass to be used in bonding the crystalline inorganic particles. The low percentage by weight of glass 24 also insures that pores will not be filled by excess glass and the resulting porosity of porous body 20 will be high. For these reasons, glass particles 24a are selected to be less than 3-percent by weight of the final porous body 20.

In general the packing factor, as described in "Packing Spheres" by Gardner and hereby incorporated by reference, determines the amount of porosity. Wide particle distributions create tighter packing factors and therefore lower percentage porosity. Narrow particle distributions allow for less dense packing and therefore higher porosity. The average size of the particles dictates the porosity size. The average pore size may be 0.05-microns to 130-microns.

Figure 2A:
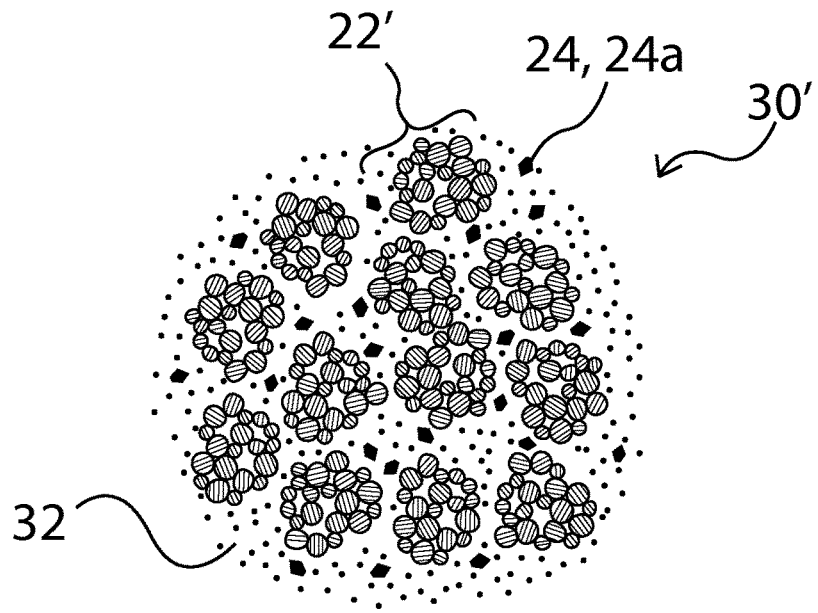
FIG. 2a is schematic representation of a composition according to the invention, the schematic depicting a mixture of glass particles, an organic binder, and crystalline inorganic particles having micro porosity.
Figure 2B:
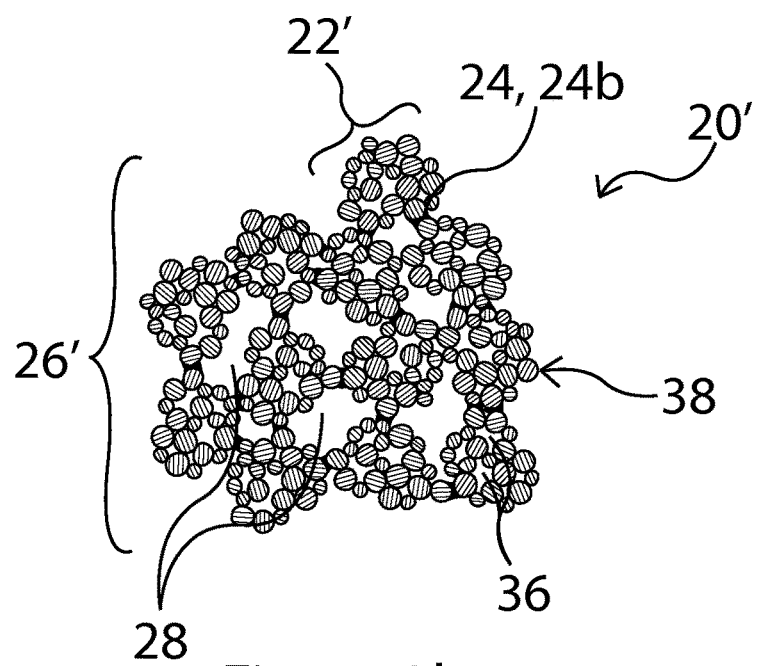
FIG. 2b is a schematic representation of an open-cell porous body resulting after sintering of the composition depicted in FIG. 2a, the resulting structure having both macro porosity and micro porosity.

FIG. 2b illustrates another embodiment of a porous body 20, this time porous body 20', which has two porosity distributions, a micro porosity distribution and a macro porosity distribution. Porous body 20' comprises inorganic crystalline particles 22' bonded together by glass 24. Inorganic crystalline particles 22' have their own micro pores 36. The location of micro pores 36 may be at least one from the group of on the surface 38 of inorganic crystalline particles 22' and within the inorganic crystalline particles. Micro pores 36 may also be interconnected to form an open-cell micro porous body that makes up each inorganic crystalline particle 22'. The combined structure of micro porous inorganic crystalline particles 22' bonded together by glass 24 creates a matrix 26' that contains macro-interconnected pores 28 and micro pores 36. Porous body 20' preferably has macro porosity greater than 20-percent by volume insuring that the porous body is an open-cell porous body. Porous body 20' may take on any shape necessary for the intended use of the open-cell porous body.

Matrix 26 is formed by sintering green open-cell compact 30' depicted in FIG. 2a. Green open-cell compact 30' comprises inorganic crystalline particles 22', glass particles 24a and an organic binder 32. Water may further be incorporated with organic binder 32. During the sintering process organic binder 32 volatilizes, glass particles 24a melt, wet and bond with the crystalline inorganic particles 22'. In regions where two crystalline inorganic particles 22' are in close proximity to each other, glass 24 connects the crystalline inorganic particles. As the sintering temperature is lowered, the connecting glass solidifies below working temp to create glass regions 24b that bond crystalline inorganic particles 22'. The resulting structure, matrix 26', is crystalline inorganic particles 22' bonded by glass regions 24b with interconnected pores 28 and micro pores 36.

Inorganic crystalline particles 22' may have any of the properties of the inorganic crystalline particles 22 described above, but with the additional property of having micro pores 36. Inorganic crystalline particles 22' may be from the class of materials known as zeolites, porous oxide structures that have well-defined pore structures due to a high degree of crystallinity. Inorganic crystalline particles 22' may be formed by pan drying or spray drying inorganic crystals without a glass phase and then partially sintering the created particles. Inorganic crystalline particles 22' may also be formed from glass and inorganic crystalline particles in much the same manner as porous body 20 was formed and then crunching to create particles.

In the embodiment where inorganic crystallites are spray dried to form micro porous particles, the process is as follows. Crystallites of any size are first combined with 1-to 1.5 percent of a dispersant. An example dispersant is ammonium polyacrylate. 40-to-60 percent water is then added along with 2-5 percent organic binder. Some examples of organic binders that may be used include polyvinyl alcohol (PVA) and polyethylene glycol (PEG). The mixture is then ball milled and spray dried to create granules. The granules are calcined at a temperature that partially sinters the particles so that the crystallites diffuse together. The result is a micro porous granule that can then be used as micro porous inorganic crystalline particles 22'.

Figure 3A:
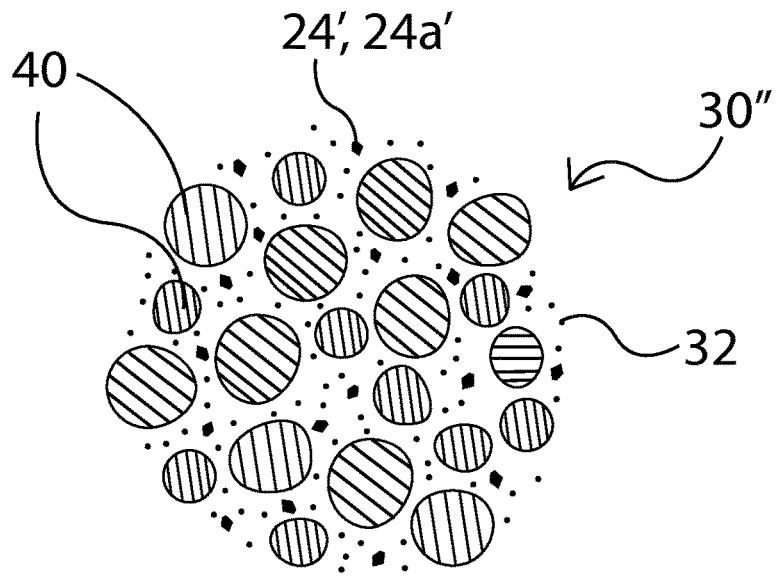
FIG. 3a is a schematic representation of a composition according to the invention for creating micro porous particles, the schematic depicting a mixture of crystallites, glass particles and an organic binder.
Figure 3B:
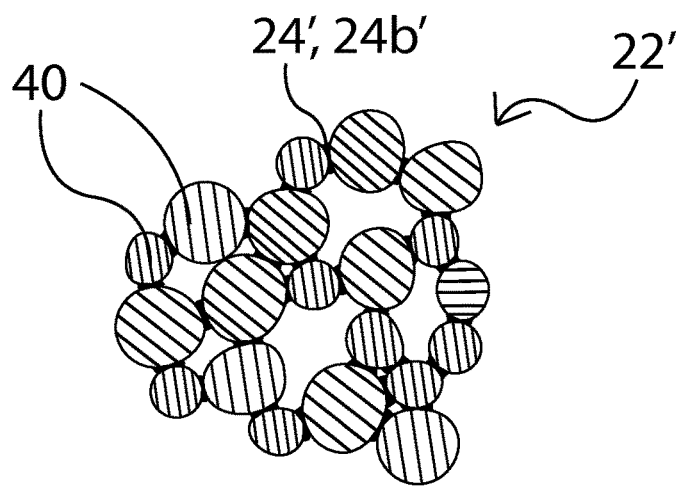

FIGS. 3a and 3b show another embodiment for forming micro porous inorganic crystalline particles 22' (a.k.a. porous particle 22') when a glass phase is used. Measured amounts of individual crystallites 40, glass particles 24a' (a.k.a. micro porous bonding glass) and organic binder 32 are mixed together in a pan granulator to form green open-cell body 30". Water may further be incorporated with organic binder 32. Green open-cell body 30" is in the form of granules. Green open-cell compact 30" is then heated to a temperature of 350° C. to 600° C. to burn off organic binder 32. The sintering temperature is then raised above the working point of glass particles 24a' allowing the glass 24' to wet between and around contact points of adjacent individual crystallites 40. The working point of glass particles 24a' should be higher than that of glass 24 that will be used in the subsequent final preparation of open-cell porous body 20' that has a dual porosity distribution. The molten glass 24' then reacts with individual crystallites 40. The porous particle 22" is then cooled, glass 24' solidifies and glass regions 24b' are created that bond crystallites 40.

Figure 4:
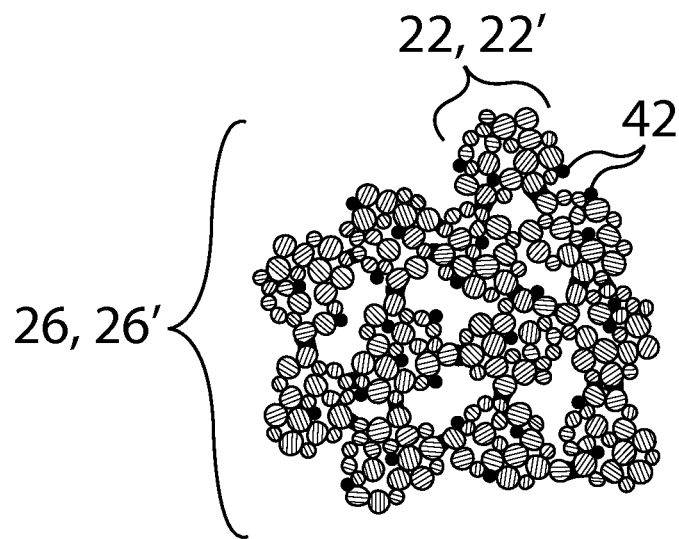
FIG. 4 is a schematic representation of an open-cell porous body formed from crystalline inorganic particles having micro porosity, the open-cell porous body permeated with a catalyst.

In one embodiment, FIG. 4, a catalyst 42 may added as particles, molecules, or atoms throughout the open-cell porous matrix (26, 26'). Catalyst 42 may be added by slurry infiltration prior to firing or by adding the catalyst after the open-cell porous matrix (26, 26') has been formed. Catalyst 42 may be nanoparticles of platinum, carbon and nickel or any other catalyst needed to catalyze a reaction. The resulting structure may then be used for initiating a variety of reactions. Exemplary uses depending on the specific catalyst 42 used include: a catalytic converter for car exhaust, fluid extracting catalysts, exothermic generators, water purification, etc.

Figure 5:
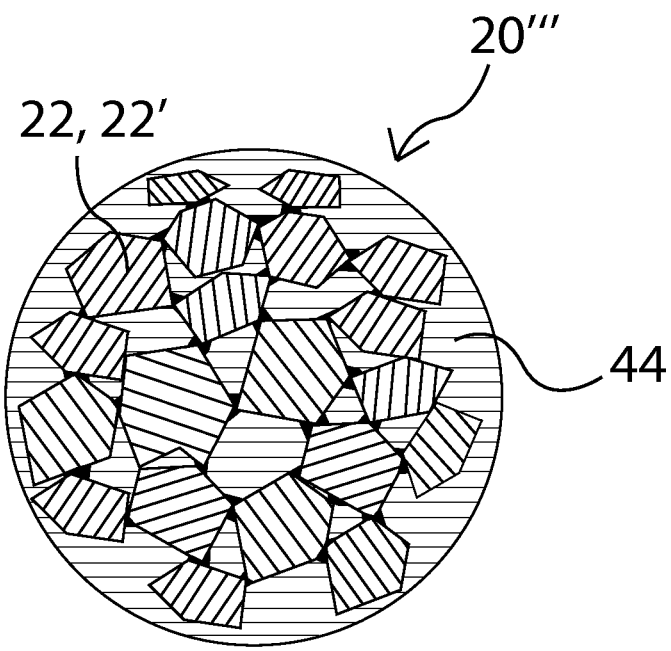
FIG. 5 is a schematic representation of an open-cell porous body matrix that has had the pores permeated with a liquid material, the liquid material solidified to form a composite material.

In another embodiment, FIG. 5, open-cell porous body 20 is a precursor material for ceramic matrix composite body 20'''. The matrix (26, 26') of open cell-porous body (20, 20') is permeated with a liquid material such as a metal or polymer, the liquid material is then solidified. Examples of filling-materials 44 are aluminum, nickel, cobalt, etc. Ceramic matrix composite body 20''', when permeated with metal may have applications in armor, cutting tools, etc.

Several examples of the aforementioned embodiments are described in these non-limitative following examples.

TABLE 1

| Formulation 1 - Production of Porous Bodies with Macro Porosity | | |
| --- | --- | --- |
| Material | Percent by weight | Comments |
| Inorganic Crystals | 97.0-99.5 | Based on final composition |
| Glass | 0.5-3.0 | Final composition, W.P. > 900° C. |
| Organic Binder I | 1.0-2.0 | Fugitive composition |
| Organic Binder II | 0.5 | Fugitive composition |
| Water | 5.0 | Fugitive composition |

EXAMPLE 1

A first mixture was prepared according to formulation guidelines of Table 1. The first mixture included combining A14 un-ground alumina (99-percent by weight of final composition) having an average particle size D50 of 80-microns with G200 feldspar glass (1-percent by weight of final composition) having an average particle size D50 of 5-microns and a glass working temperature over 1000° C. To 100-parts by weight of this first mixture was added 1-part polyvinyl alcohol and 0.5-parts polyethylene glycol as a mixture of organic binders. 5-parts water was also added. Organic binders and water make up the fugitive composition. The mixture was blended in an EIRICH®-type mixer to obtain a wet mix. The wet mix was pressed and dried into a green compact. The green compact was machined into 3-inch long by ½-inch diameter cylinders. The green compact was heated in air to de-bind at 600° C. for 1-hour to create an open-cell green compact. The temperature was then raised to 1550° C. for 1-hour where the green open-cell compact was sintered above the working temperature to allow the glass to melt and wet contacting surfaces of the A14 un-ground alumina particles. 5-percent shrinkage occurred. The open-cell porous body was then cooled to room temperature. The open-cell porous body was measured using the Archimedes method and shown to have 45-volume percent porosity. A 3-point bend test showed strength of 4 kpsi.

EXAMPLE 2

A second mixture was prepared according to formulation guidelines of Table 1. The second mixture included combining 24-grit alundum grains (97-percent by weight of final composition) with G200 feldspar glass (3-percent by weight of final composition) having an average particle size D50 of 5-microns and a glass working temperature over 1000° C. To 100-parts by weight of this second mixture was added 1-part polyvinyl alcohol and 0.5-parts polyethylene glycol as a mixture of organic binders. 5-parts water was also added. Organic binders and water make up the fugitive composition. The mixture was blended in an EIRICH®-type mixer to obtain a wet mix. The wet mix was pressed and dried into a green compact. The green compact was machined into 3-inch long by ½-inch diameter cylinders. The green compact was heated in air to de-bind at 600° C. for 1-hour to create an open-cell green compact. The temperature was then raised to 1550° C. for 1-hour where the green open-cell compact was sintered above the working temperature to allow the glass to melt and wet contacting surfaces of the alundum particles. 3-percent shrinkage occurred. The open-cell porous body was then cooled to room temperature. The open-cell porous body was measured using the Archimedes method and shown to have 45-volume percent porosity. A 3-point bend test showed strength of 3 kpsi.

TABLE 2

Formulation 2 - Production of Porous Bodies with Macro Porosity and Micro Porosity

| Material | Percent by weight | Comments |
| --- | --- | --- |
| Porous Granules | 97.0-99.5 | Based on final composition |
| Glass | 0.5-3.0 | Final composition, W.P. > 900° C. |
| Organic Binder I | 1.0-2.0 | Fugitive composition |
| Organic Binder II | 0.10-0.15 | Fugitive composition |
| Water | 5.0 | Fugitive composition |

EXAMPLE 3

Ceramic granules with micro porosity were first prepared by taking alumina crystallites of D50 1.5-microns and adding water (40-percent by weight), then 1-percent of ammonium polyacrylate dispersant and then 2-percent by weight polyvinyl alcohol. The mixture was ball milled and then spray dried into granules D50 100-microns. The alumina granules were heated to 1280° C. to form necks between the particles. These micro porous granules were then used according to the guidelines of Table 2 to prepare a third mixture. The third mixture included combining alumina ceramic granules (99-percent by weight of final composition) with ELAN® glass (1-percent by weight of final composition) having an average particle size of 20-30 microns and a glass working temperature of 1037° C. To 100-parts by weight of this first mixture was added 1.5-part polyvinyl alcohol and 0.1-parts polyethylene glycol as a mixture of organic binders. 5-parts water was also added. Organic binders and water make up the fugitive composition. The mixture was blended in an EIRICH®-type mixer to obtain a wet mix. The wet mix was pressed and dried into a green compact. The green compact was machined into 3-inch long by ½-inch diameter cylinders. The green compact was heated in air to de-bind at 600° C. for 1-hour to create an open-cell green compact. The temperature was then raised to 1550° C. for 1-hour where the green open-cell compact was sintered above the working temperature to allow the glass to melt and wet contacting surfaces of the particles. Two-to-three percent shrinkage occurred. The open-cell porous body was then cooled to room temperature. The open-cell porous body was measured using the Archimedes method and shown to have 45-volume percent porosity.

While several embodiments of the invention, together with modifications thereof, have been described in detail herein and illustrated in the accompanying drawings and examples, it will be evident that various compositions and further modifications are possible without departing from the scope of the invention. Nothing in the above specification is intended to limit the invention more narrowly than the appended claims. The examples given are intended only to be illustrative rather than exclusive.

What is claimed is:

1. A body, comprising:
   a) crystalline inorganic particles;
   b) 0.5 to 3-weight percent glass; and
   c) wherein said crystalline inorganic particles are bonded together by said glass to form a matrix with interconnected pores having a porosity of greater than 20-percent by volume, wherein said matrix is annealed above 1550° C.

2. A body as recited in claim 1, wherein said glass has silica content greater than 50-percent by weight.

3. A body as recited in claim 2, wherein the body is an acid resistant body.

4. A body as recited in claim 1, wherein said glass has a glass working point temperature above 900° C.

5. A body as recited in claim 1, wherein said glass has a glass working point temperature above 1000° C.

6. A body as recited in claim 1, wherein said glass is a wetted layer connecting said crystalline inorganic particles.

7. A body as recited in claim 1, wherein said glass is completely amorphous.

8. A body as recited in claim 1, wherein said crystalline inorganic particles comprise more than 97-percent by weight of said body.

9. A body as recited in claim 1, wherein said crystalline inorganic particles are ceramic particles.

10. A body as recited in claim 1, wherein said crystalline inorganic particles are an oxide.

11. A body as recited in claim 1, wherein said crystalline inorganic particles are a carbide.

12. A body as recited in claim 1, wherein said crystalline inorganic particles are a nitride.

13. A body as recited in claim 1, wherein said crystalline inorganic particles are a boride.

14. A body as recited in claim 1, wherein said crystalline inorganic particles are metal.

15. A body as recited in claim 1, wherein said crystalline inorganic particles have a diameter of 44-microns to 250-microns.

16. A body as recited in claim 1, wherein said crystalline inorganic particles have a diameter greater than 250-microns.

17. A body as recited in claim 1, wherein said interconnected pores have an average pore size of 0.05-microns to 1-micron.

18. A body as recited in claim 1, wherein said interconnected pores have an average pore size of 1-micron to 130-microns.

19. A body as recited in claim 1, wherein said matrix is stable above 1200° C.

20. A body as recited in claim 1, wherein said matrix has a modulus of rupture greater than 1 kpsi.

21. A body as recited in claim 1, wherein said crystalline inorganic particles have a micro porous open-cell structure with micro pores.

22. A body as recited in claim 21, wherein said micro pores have a micro pore surface and a catalyst bonded to said micro pore surface.

23. A body as recited in claim 1, further comprising a liquid filling-material solidified to fill said interconnected pores.

24. A body as recited in claim 23, wherein said filling-material is a metal.

25. A body as recited in claim 24, wherein said metal is at least one selected from the group consisting of aluminum, nickel and cobalt.

26. A body as recited in claim 1, wherein said inorganic crystalline particles have a size distribution and wherein said matrix is formed from initial glass particles having an average particle size distribution that is more than 10 times and up to 20-times smaller than the average particle size distribution of said inorganic particles.

27. A body, comprising:
a) $Al_2O_3$ particles;
b) 0.5 to 3-weight percent glass; and
c) wherein said $Al_2O_3$ particles are bonded together by said glass to form a matrix with interconnected pores having a porosity of greater than 20-percent by volume; wherein said matrix has a modulus of rupture of at least 4-kpsi.

28. A body as recited in claim 27, wherein the body is an acid resistant body.

29. A body as recited in claim 27, wherein said matrix is annealed above 1550° C.

30. A body as recited in claim 27, wherein said $Al_2O_3$ particles have a size distribution, wherein said matrix is formed from initial glass particles having an average particle size distribution that is more than 10 times and up to 20 times smaller than the average particle size distribution of said $Al_2O_3$ particles.

31. A body as recited in claim 27, wherein said interconnected pores have an average size of 0.05 to 1.0-microns.

32. A body, comprising:
a) 0.5 to 3-weight percent glass as a first glass:
b) crystalline inorganic particles having a micro porous open-cell structure, said micro porous open-cell structure formed from individual crystallites bonded together by micro porous bonding glass having a higher melting temperature than said first glass; and
c) wherein said crystalline inorganic particles having said micro porous open-cell structure are bonded together by said first glass to form a matrix with interconnected pores having a macro porosity of greater than 20-percent by volume.

33. A body, comprising:
a) crystalline inorganic particles;
b) 0.5 to 3-weight percent glass; and
c) wherein said crystalline inorganic particles are bonded together by said glass to form a matrix with interconnected pores having a porosity of greater than 20-percent by volume, wherein said inorganic crystalline particles have a size distribution and wherein said matrix is formed from initial glass particles having an average particle size distribution that is more than 10-times smaller than the average particle size distribution of said inorganic particles.

34. A body as recited in claim 33, wherein said initial glass particles have an average size distribution that is 10-to-20 times smaller than the average particle size distribution of said inorganic particles.

35. A body as recited in claim 33, wherein said matrix has a modulus of rupture of at least 4-kpsi.

* * * * *